US008112588B2

(12) United States Patent
Schneider

(10) Patent No.: US 8,112,588 B2
(45) Date of Patent: Feb. 7, 2012

(54) SORTING CACHE OBJECTS BASED ON ACCESS COUNTERS RESET UPON GARBAGE COLLECTION

(75) Inventor: James P. Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 400 days.

(21) Appl. No.: 12/393,990

(22) Filed: Feb. 26, 2009

(65) Prior Publication Data

US 2010/0217938 A1    Aug. 26, 2010

(51) Int. Cl.
*G06F 12/08* (2006.01)
(52) U.S. Cl. ............... 711/133; 711/141; 711/E12.017
(58) Field of Classification Search .................. None
See application file for complete search history.

(56) References Cited

U.S. PATENT DOCUMENTS

| | | | | |
|---|---|---|---|---|
| 5,432,919 A * | 7/1995 | Falcone et al. | ............... | 711/134 |
| 5,649,156 A * | 7/1997 | Vishlitzky et al. | ............ | 711/136 |
| 6,049,850 A * | 4/2000 | Vishlitzky et al. | ............ | 711/136 |
| 6,385,697 B1 * | 5/2002 | Miyazaki | ...................... | 711/128 |
| 6,681,297 B2 * | 1/2004 | Chauvel et al. | ............... | 711/130 |
| 6,697,850 B1 * | 2/2004 | Saunders | ...................... | 709/219 |
| 6,745,295 B2 * | 6/2004 | Rodriguez | .................... | 711/136 |
| 6,748,491 B2 * | 6/2004 | Rodriguez | .................... | 711/122 |
| 6,748,558 B1 * | 6/2004 | Gonzales et al. | ............. | 714/47.1 |
| 6,874,056 B2 * | 3/2005 | Dwyer et al. | ...................... | 711/3 |
| 7,035,870 B2 * | 4/2006 | McGuire et al. | ............... | 707/704 |
| 7,287,122 B2 * | 10/2007 | Rajamony et al. | ............ | 711/120 |
| 7,478,197 B2 * | 1/2009 | Shen et al. | ...................... | 711/117 |
| 7,596,793 B2 * | 9/2009 | Grabarnik et al. | ............ | 719/318 |
| 7,774,546 B1 * | 8/2010 | Wright et al. | ................. | 711/118 |
| 7,908,439 B2 * | 3/2011 | Brunheroto et al. | .......... | 711/137 |
| 2002/0065992 A1 * | 5/2002 | Chauvel et al. | ............... | 711/141 |
| 2002/0087563 A1 * | 7/2002 | Ghemawat et al. | ........... | 707/100 |
| 2002/0156980 A1 * | 10/2002 | Rodriguez | .................... | 711/136 |
| 2003/0070045 A1 * | 4/2003 | Dwyer et al. | .................. | 711/128 |
| 2004/0128674 A1 * | 7/2004 | Grabarnik et al. | ............ | 719/318 |
| 2008/0104152 A1 * | 5/2008 | Stephens et al. | .............. | 707/206 |
| 2008/0282032 A1 * | 11/2008 | Shen et al. | ...................... | 711/117 |
| 2008/0320228 A1 * | 12/2008 | Brunheroto et al. | .......... | 711/137 |
| 2009/0043966 A1 * | 2/2009 | Shen et al. | ...................... | 711/122 |
| 2010/0122031 A1 * | 5/2010 | Strumpen et al. | ............. | 711/122 |
| 2010/0122034 A1 * | 5/2010 | Strumpen et al. | ............. | 711/125 |
| 2010/0122035 A1 * | 5/2010 | Strumpen et al. | ............. | 711/136 |
| 2010/0122057 A1 * | 5/2010 | Strumpen et al. | ............. | 711/165 |

OTHER PUBLICATIONS

Chen, W., et al., "Profile-guided Proactive Garbage Collection for Locality Optimization", PLDI '06, Jun. 11-14, 2006, Ottawa, Canada, 10 pages.

* cited by examiner

*Primary Examiner* — Kevin Verbrugge
(74) *Attorney, Agent, or Firm* — Lowenstein Sandler PC

(57) ABSTRACT

Some embodiments of a method and an apparatus to improve locality of references for objects have been presented. In one embodiment, an access counter is provided to each of a set of objects in a computing system. The access counter is incremented each time a respective object is accessed. In response to a request to organize the objects, the objects are sorted by their respective counts of access in the access counters.

17 Claims, 4 Drawing Sheets

SORTING CACHE OBJECTS BASED ON ACCESS COUNTERS RESET UPON GARBAGE COLLECTION

TECHNICAL FIELD

Embodiments of the present invention relate to computing systems, and more specifically to improving locality of references for objects in a computing system.

BACKGROUND

Conventionally, a computing system typically includes a processor, a cache memory, and a main memory. Objects, such as data, are stored in the main memory. However, once an object is accessed by the processor, the object is placed in the cache memory so that the processor can readily act on the object if needed. This is because the processor generally can access the cache memory much faster than the main memory. Furthermore, the objects in the cache memory may change from time to time depending on which objects are accessed by the processor. Note that the cache memory is not used for long term storage, rather, the cache memory is used as a convenient temporary storage space for the processor.

To improve the efficiency of the computing system, attempts have been made to more efficiently utilize the cache memory. As part of this effort, some conventional computing systems use a bit in the header of each object to track accesses made to the respective object. This bit may be referred to as the "access bit." Specifically, if an object has been accessed since the last time garbage collection and locality optimization are run, then this bit in the header of this object is set to indicate so. Objects with the access bits set are generally presumed to be in the current working set of processes or threads, and these objects may be retained in the cache memory longer.

Although the access bits in the headers of the objects provide a simple solution to improve the efficiency of the cache memory usage, however, the information provided by the access bits is very limited. As a result, the improvement to the efficiency of the cache memory usage relying on the access bits is also limited.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
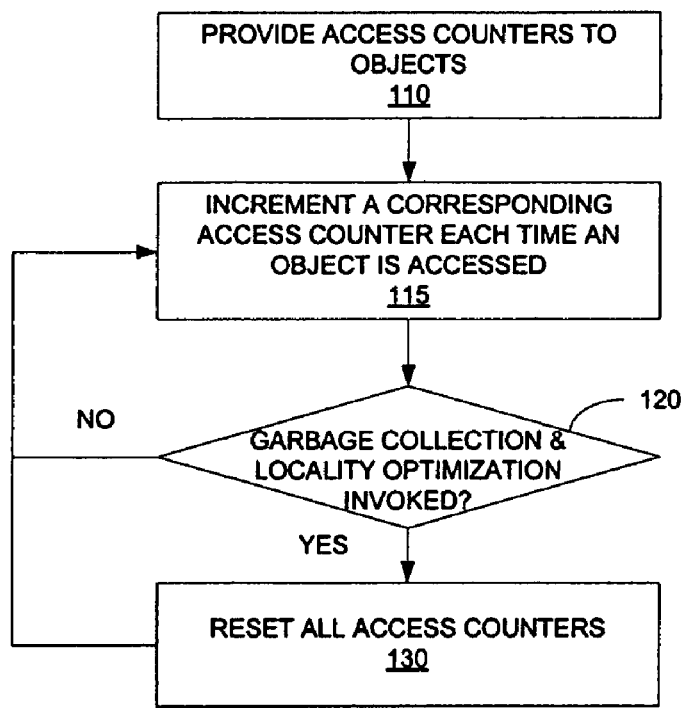
FIG. 1A illustrates a flow diagram of one embodiment of a method to manage objects in a computing system.

Described herein are some embodiments of a method and an apparatus to improve locality of references for objects. In one embodiment, an access counter is provided to each of a set of objects in a computing system. The set of objects may be stored in a cache memory of the computing system. The access counter is incremented each time a respective object is accessed. In response to a request to organize the objects, the objects are sorted by their respective counts of access in the access counters. More details of some embodiments of the method and apparatus to improve locality of references for objects are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates a flow diagram of one embodiment of a method to manage objects in a computing system. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the computing system 200 illustrated in FIG. 2 in some embodiments.

Initially, processing logic provides access counters to objects in a computing system (processing block 110). An object as used herein broadly refers to a conceptual entity or a logical entity with an allocated region of storage. An object may contain data, instructions, or both, depending on the type of programming performed in the computing system. Each object is associated with its own access counters. Processing logic increments a corresponding access counter each time an object is accessed (processing block 115). For instance, processing logic increments an access counter associated with an object when the first object is read. Processing logic increments the access counter again later when the object is modified. As such, the count in each access counters represents the number of times the corresponding object has been accessed.

In some embodiments, processing logic checks if garbage collection and locality optimization have been invoked (processing block 120). If garbage collection and locality optimization have been invoked, then processing logic transitions to processing block 130. Otherwise, if garbage collection and locality optimization have not been invoked, then processing logic returns to processing block 115 to continue keeping track of the number of times the objects have been accessed. In processing block 130, processing logic resets all access counters (processing block 130). Then processing logic returns to processing block 115 to continue keeping track of the number of times the objects have been accessed. In other words, the counts in the access counters represent the number of times the corresponding objects have been accessed since last garbage collection and locality optimization. These counts are useful in managing the objects, especially in improving locality of references for the objects as discussed below.

Figure 1B:
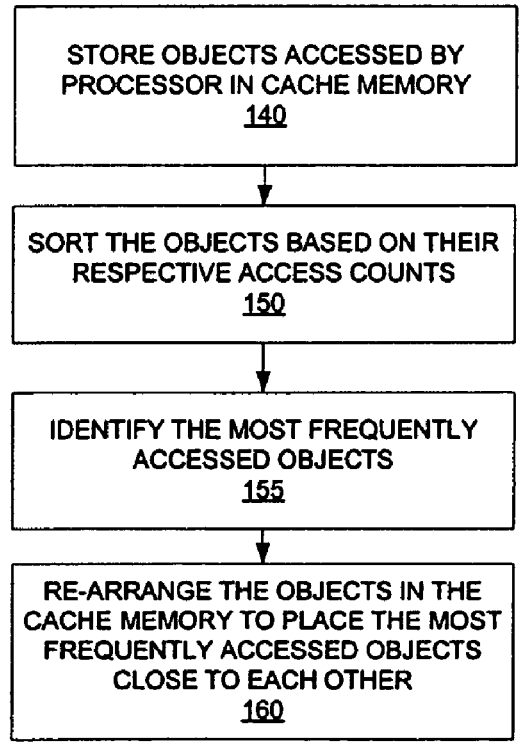
FIG. 1B illustrates a flow diagram of one embodiment of a method to improve locality of references for objects in a computing system.

FIG. 1B illustrates a flow diagram of one embodiment of a method to improve locality of objects in a computing system. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the computing system 200 illustrated in FIG. 2 in some embodiments.

Processing logic stores objects accessed by a processor in a cache memory in a computing system (processing block 140). The processor may include one or more processing devices, single-core processor, multi-core processor, etc. Furthermore, the processor is sometimes referred to as a central processing unit (CPU) in the computing system. In some embodiments, the processor and the cache memory reside on the same integrated circuit (IC) substrate. Alternatively, the processor and the cache memory reside on different IC substrates, but are, nevertheless, incorporated into the same semiconductor package. In general, the cache memory is designed to allow fast access to objects stored in the cache memory. Objects that have been accessed by the processor are usually placed in the cache memory to shorten access time because these objects are generally likely to be accessed again soon.

To further improve the access time, processing logic uses the access counts generated as discussed above with reference to FIG. 1A to organize the objects in the cache memory.

In some embodiments, processing logic sorts the objects based on their respective access counts (processing block 150). Then processing logic identifies the objects that are most frequently accessed (processing block 155). For instance, processing logic may choose objects with access counts above a predetermined threshold to be the most frequently accessed objects. Processing logic may re-arrange the objects in the cache memory to place the most frequently accessed objects close to each other (processing block 160). Alternatively, processing logic may divide the objects into multiple categories based on their access counts and then place objects within the same category close to each other. For instance, processing logic may classify objects with access counts over a high threshold in a first category, objects with access counts between the high threshold and a low threshold in a second category, and objects with access counts below the low threshold in a third category. Then processing logic may place objects in the first category in a first region of the cache memory, objects in the second category in a second region of the cache memory, and objects in the third category in a third region of the cache memory. Because the most frequently accessed objects are placed close to each other, the processor does not likely have to traverse far away from a current location in the cache memory in order to access the next object in the cache memory. As a result, the access time of the objects in the cache memory can be further improved.

Figure 2:
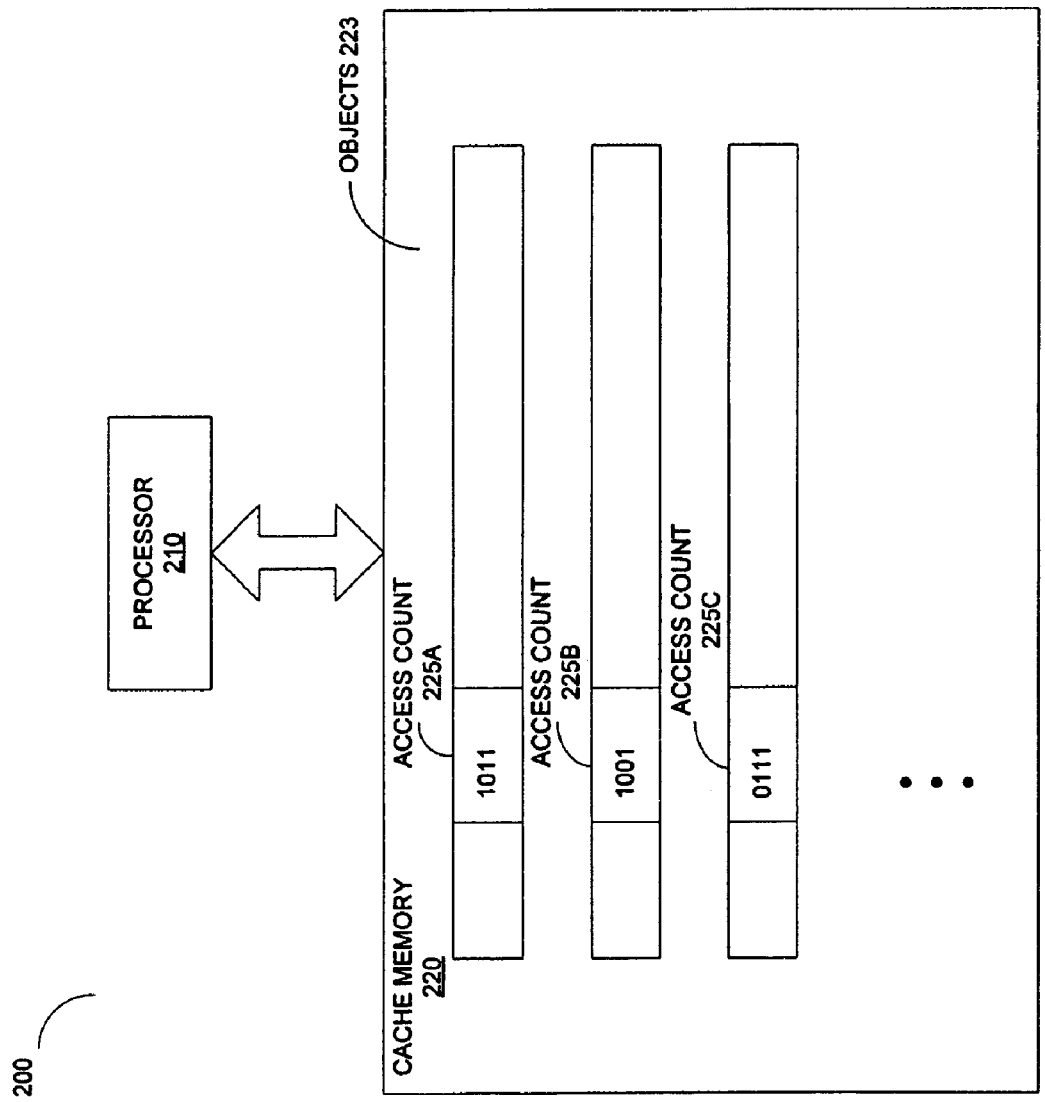
FIG. 2 illustrates a block diagram of one embodiment of a computing system.

FIG. 2 illustrates a block diagram of one embodiment of a computing system. The computing system 200 may be implemented using a server, a personal computer, a personal digital assistant, a cellular telephone, etc. One exemplary computer system usable to implement the computing system 200 is shown in details in FIG. 4.

In some embodiments, the computing system 200 includes a processor 210 and a cache memory 220. The processor 210 may include one or more processing devices, single-core processor, multi-core processor, etc. Furthermore, the processor 210 is sometimes referred to as a central processing unit (CPU) in the computing system 200. In some embodiments, the processor 210 and the cache memory 220 reside on the same IC substrate. Alternatively, the processor 210 and the cache memory 220 reside on different IC substrates, but are, nevertheless, incorporated into the same semiconductor package. In another alternate embodiment, the processor 210 and the cache memory 220 reside on different IC substrates and are packaged separately. The processor 210 can generally access objects from the cache memory 220 faster than from other storage devices in the computing system 200 because the cache memory 220 is designed to allow fast access of objects stored in the cache memory 220. Objects 223 that have been accessed by the processor 210 are usually placed in the cache memory 220 to shorten access time because these objects 223 are generally likely to be accessed again soon.

In some embodiments, each of the objects 223 includes an access count field, such as access count fields 225A-225C. The number of bits in each access count field may vary in different embodiments. In the example illustrated in FIG. 2, the access count fields 225A-225C are 4-bit long. The access count fields 225A-225C act as the access counters for the objects 223. Each time the processor 210 accesses one of the objects 223, the count in the corresponding access count field is incremented. In some embodiments, the counts in the access count fields 225A-225C are reset to zero upon invocation of garbage collection and locality optimization. Therefore, the counts in the access count fields 225A-225C represent the number of times the respective objects 223 have been accessed by the processor 210 since the last garbage collection and locality optimization.

Using the number of times the respective objects 223 have been accessed by the processor 210 since the last garbage collection and locality optimization, the objects 223 in the cache memory 220 can be re-arranged to reduce access time of the objects 223. In some embodiments, the most frequently accessed objects are identified and placed closer to each other in the cache memory 220. Because, in some embodiments, the cache memory 220 is designed so that any given cache block can only hold data from a very small subset of addresses available to the processor 210, and any given address can only be represented in a very small number of cache blocks, placing the frequently accessed objects close together reduces the risk of two or more frequently accessed objects contending for the same set of cache blocks.

Note that any or all of the components of the computing system 200 and associated hardware may be used in various embodiments of the present invention. However, it can be appreciated that other configurations of the computing system 200 may include more or fewer components than those discussed above. The processor 210 and the cache memory 220 are illustrative examples of components in the computing system 200. One should appreciate that other types of components and/or devices may be included in the computing system 200 in other embodiments. For example, the processor 210 may be further coupled to an input/output controller, a memory controller, and additional memory or storage devices in the computing system 200.

Figure 3:
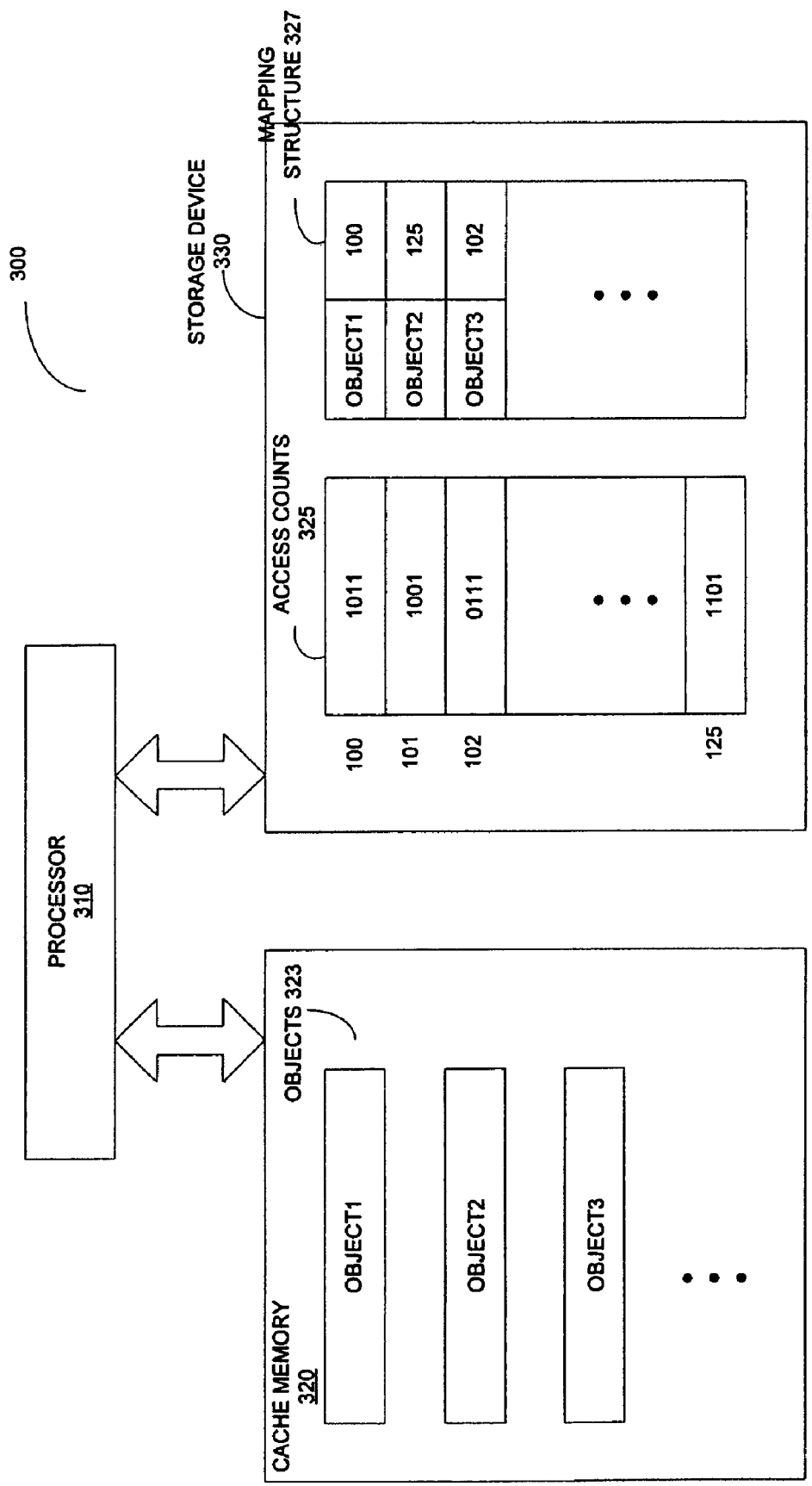
FIG. 3 illustrates a block diagram of an alternate embodiment of a computing system.

FIG. 3 illustrates a block diagram of an alternate embodiment of a computing system. The computing system 300 may be implemented using a server, a personal computer, a personal digital assistant, a cellular telephone, etc. One exemplary computer system usable to implement the computing system 300 is shown in details in FIG. 4.

In some embodiments, the computing system 300 includes a processor 310, a cache memory 320, and a storage device 330. As discussed above, the processor 310 may include one or more processing devices, single-core processor, multi-core processor, etc. Furthermore, the processor 310 is sometimes referred to as a central processing unit (CPU) in the computing system 300. In some embodiments, the processor 310 and the cache memory 320 reside on the same IC substrate. Alternatively, the processor 310 and the cache memory 320 reside on different IC substrates, but are incorporated into the same semiconductor package. In another alternate embodiment, the processor 310 and the cache memory 320 reside on different IC substrates and are packaged separately. Objects 323 that have been accessed by the processor 310 are usually placed in the cache memory 320 to shorten access time because these objects 323 are generally likely to be accessed again soon.

To keep track of the number of times the objects 323 have been accessed by the processor 310, an access counter is provided to each of the objects 323. The access counts 325 generated by the access counters are stored in a separate memory space provided by the storage device 330. In some embodiments, the cache memory 320 and the storage device 330 are implemented in the same component, but each provides separate memory address space to store the objects 323 and the access counts 325 respectively. Alternatively, the cache memory 320 and the storage device 330 are implemented in separate components, both communicably coupled to the processor 310.

In addition to the access counts 325, the storage device 330 stores a mapping structure 327 to map the objects 323 to their respective access counts 325. In some embodiments, the mapping structure 327 associates an identifier of each of the objects 323 with the address of the respective one of the access counts 325. Alternatively, the mapping structure 327 may map the objects 323 to the access counts 325 in different ways, such as by using the address of the objects 323 in the cache memory 320.

In some embodiments, the access counts 325 are reset to zero upon invocation of garbage collection and locality optimization. Thus, the access counts 325 represent the numbers of times the objects 323 have been accessed by the processor 310 since the last garbage collection and locality optimization.

As discussed above, the objects 323 in the cache memory 320 can be re-arranged to improve efficiency of the cache memory 320 using the number of times the respective objects 323 have been accessed. For example, the objects 323 may be sorted by their access counts 325. Then the most frequently accessed objects are identified and placed closer to each other in the cache memory 320.

Although this approach may incur more overhead compared to the approach illustrated in FIG. 2 due to the separate memory space for storing access counts 325 and the mapping structure 327, this approach may be more convenient when each of the objects 323 occupies one or more cachelines because there is insufficient space in the same cacheline to be assigned to storing the corresponding access counts. The size of the cacheline may vary among different embodiments (e.g., 8-byte, 16-byte, 32-byte, 64-byte, etc.). In other words, the locality of the references for the objects 323 is improved using the access counts 325.

Note that any or all of the components of the computing system 300 and associated hardware may be used in various embodiments of the present invention. However, it can be appreciated that other configurations of the computing system 300 may include more or fewer components than those discussed above. The processor 310 and the cache memory 320 are illustrative examples of components in the computing system 300. One should appreciate that other types of components and/or devices may be included in the computing system 300 in other embodiments. For example, the processor 310 may be further coupled to an input/output controller, a memory controller, and additional memory or storage devices in the computing system 300.

Figure 4:
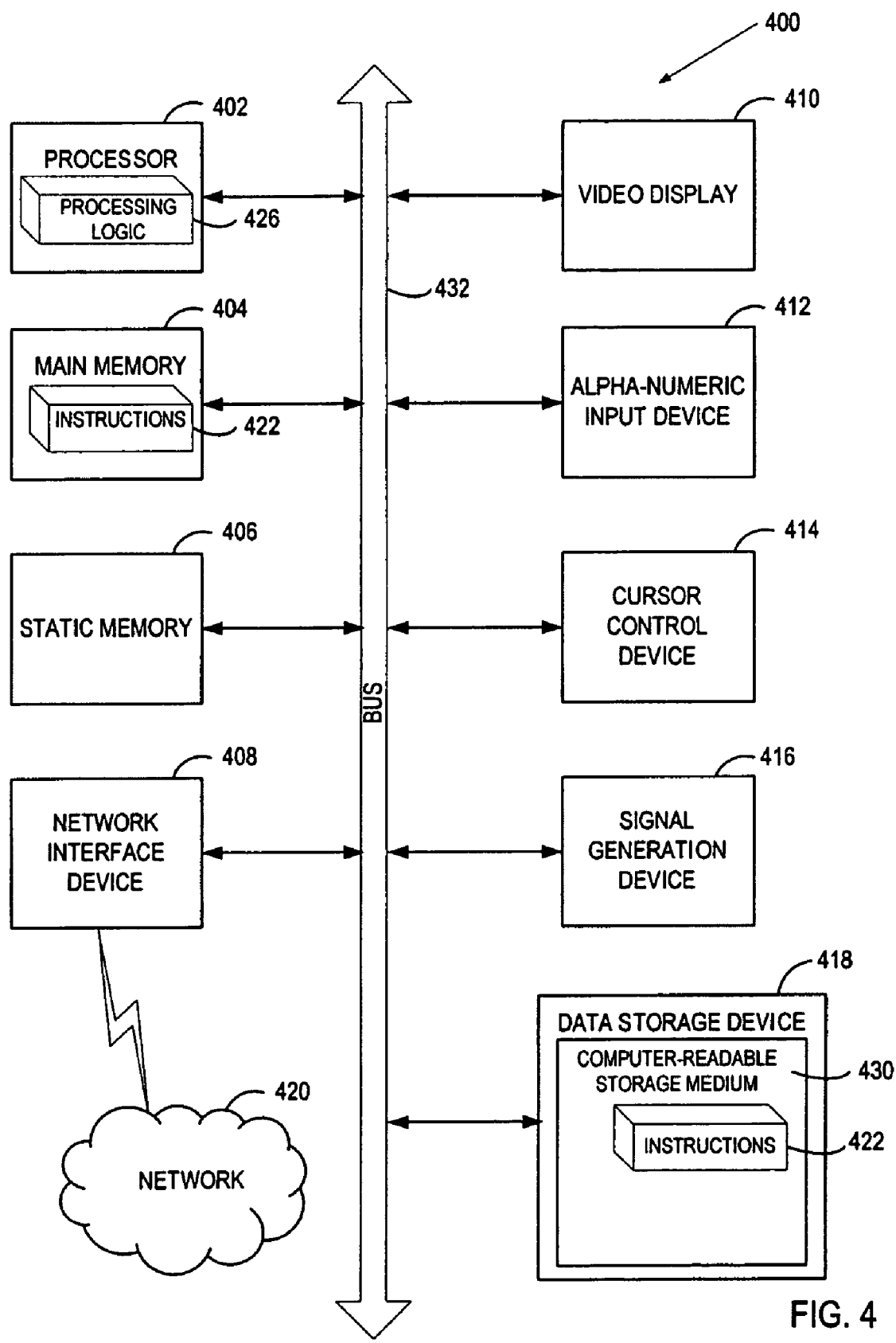
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting computer-accessible storage media. The software 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of a method and an apparatus to improve locality of references for objects have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    providing an access counter to each of a plurality of objects stored in a cache memory of a computing system;
    incrementing, by a processing device of the computing system, the access counter each time a respective object is accessed;
    in response to a request to organize the plurality of objects, the processing device sorting the plurality of objects by counts of access of the plurality of objects; and
    resetting, by the processing device, the access counter upon garbage collection and locality optimization.

2. The method of claim 1, wherein providing the access counter to each of the plurality of objects comprises:
    defining, by the processing device, a field in a respective object to hold a count of the access counter.

3. The method of claim 1, wherein providing the access counter to each of a plurality of objects comprises:
    providing memory space in a storage device separate from the plurality of objects in the cache memory to hold the counts of access of the plurality of objects; and
    defining, by the processing device, a mapping structure to map the plurality of objects to their respective counts of access.

4. The method of claim 1, further comprising:
    arranging the plurality of objects in the cache memory based on their respective counts of access to allow the processing device to access the plurality of objects from the cache memory.

5. The method of claim 1, further comprising:
    placing most frequently accessed objects close to each other in a cache memory.

6. An apparatus comprising:
    a plurality of access counters, each of the plurality of access counters being associated with a distinct one of a plurality of objects stored in a cache memory of a computing system to keep track of a number of times the distinct one of the plurality of objects is accessed;
    a sorter to sort the plurality of objects by the number of times the plurality of objects have been accessed in response to a request to organize the plurality of objects; and
    a garbage collector, implemented by the processing device, to reset the plurality of access counters upon garbage collection and locality optimization in the computing system.

7. The apparatus of claim 6, wherein each of the plurality of objects comprises a field to hold a count of a respective one of the plurality of access counters.

8. The apparatus of claim 6, further comprising:
    a storage device to provide memory space separate from the plurality of objects in the cache memory, to hold counts of the plurality of access counters, and to store a mapping structure to map the plurality of objects to their respective counts in the memory space.

9. The apparatus of claim 6, wherein the plurality of objects are arranged in the cache memory based on values in the plurality of access counters.

10. The apparatus of claim 6, wherein the most frequently accessed objects of the plurality of objects are placed close to each other in the cache memory.

11. A system comprising the apparatus of claim 6, the system further comprising:
    a processing device; and
    the cache memory.

12. The system of claim 11, further comprising:
a main memory; and
a memory controller coupled between the processing device and the main memory.

13. A non-transitory computer-readable storage medium embodying instructions that, when executed by a processing device of a computing system, will cause the processing device to perform a method comprising:
providing an access counter to each of a plurality of objects in a cache memory of the computing system;
incrementing, by the processing device, the access counter each time a respective object is accessed;
in response to a request to organize the plurality of objects, the processing device sorting the plurality of objects by counts of access of the plurality of objects; and
resetting, by the processing device, the access counter upon garbage collection and locality optimization.

14. The non-transitory computer-readable storage medium of claim 13, wherein providing the access counter to each of the plurality of objects comprises:
defining, by the processing device, a field in a respective object to hold a count of the access counter.

15. The non-transitory computer-readable storage medium of claim 13, wherein providing the access counter to each of a plurality of objects comprises:
providing memory space in a storage device separate from the plurality of objects in the cache memory, to hold the counts of access of the plurality of objects; and
defining, by the processing device, a mapping structure to map the plurality of objects to their respective counts of access.

16. The non-transitory computer-readable storage medium of claim 13, wherein the method further comprises:
arranging the plurality of objects in the cache memory based on their respective counts of access to allow the processing device to access the plurality of objects in the cache memory.

17. The non-transitory computer-readable storage medium of claim 13, wherein the method further comprises:
placing most frequently accessed objects close to each other in the cache memory.

* * * * *